Patented May 11, 1948

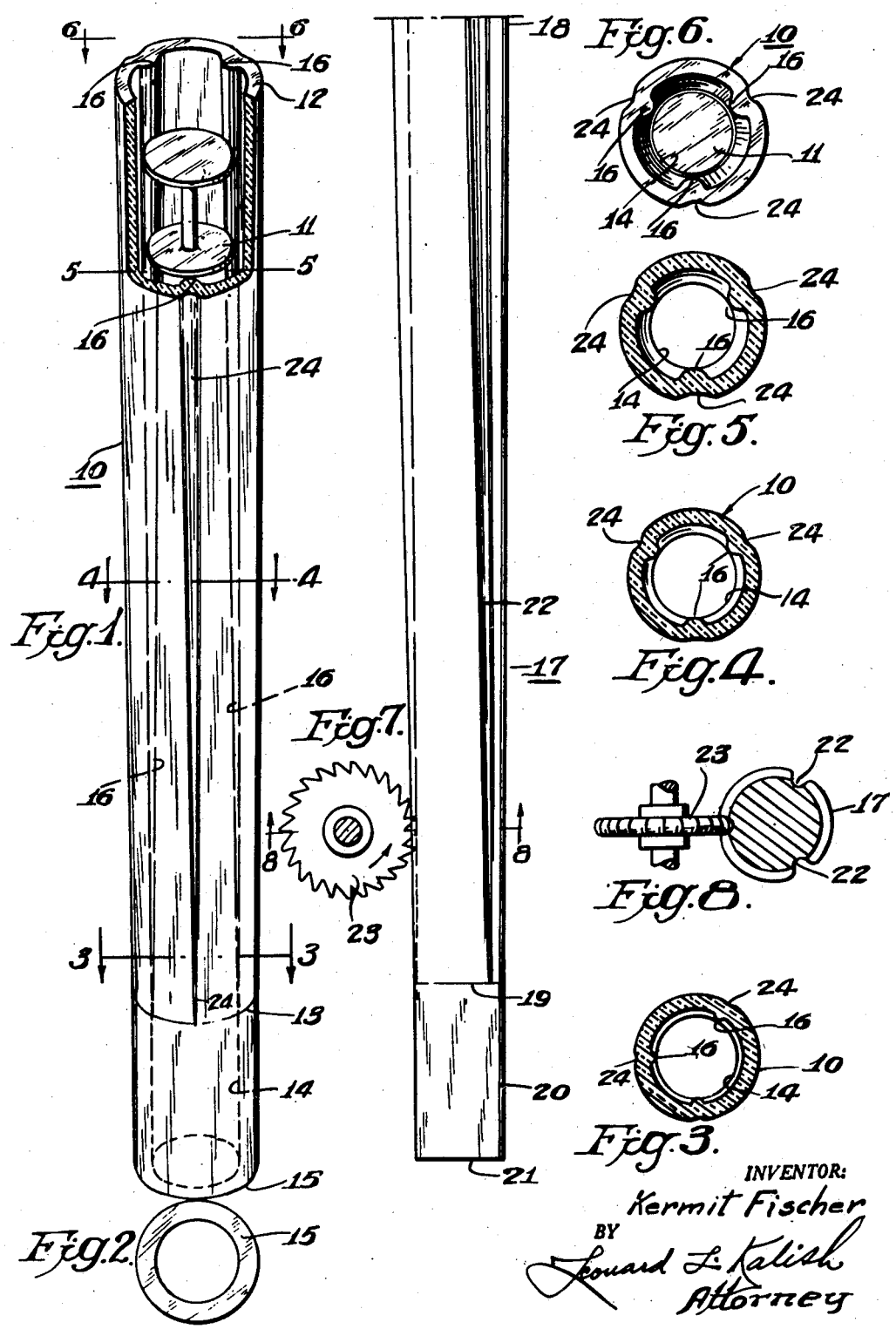

2,441,350

UNITED STATES PATENT OFFICE 2,441,350

ROTAMETER AND METERING TUBE THEREFOR

Kermit Fischer, Bridge Valley, Pa., assignor to Fischer & Porter Company, Hatboro, Pa., a corporation of Pennsylvania Application May 15, 1944, Serial No. 535,624

3 Claims. (Cl. 73—209)

The present invention relates to flow-meters and relates more particularly to new and improved metering tubes for use in rotameters and other fluid-measuring instruments.

An object of the present invention is to provide a new and improved metering tube for use in measuring the rate-of-flow of a fluid. Another object of the present invention is to provide a new and improved metering tube for a rotameter. Still another object of the present invention is to provide a rotameter tube which will guide the metering float axially therewithin.

Other objects and advantages of the present invention are apparent in the following detailed description, appended claims and accompanying drawings.

The use of a rotameter for measuring the rate-of-flow of fluid has been common practice in the art for many years. As is well known, the rotameter consists essentially of a vertical metering tube having axially-varying cross-sectional area and adapted for vertical flow of fluid therethrough and a metering float adapted for free up-and-down movement within the tube; the metering float having a transversely-extending flow-constricting portion which, with the inner wall of the metering tube, defines a generally annular metering orifice varying in area as the float moves axially within the tube responsive to variations in the rate-of-flow.

In its most common form, the rotameter comprises a transparent downwardly tapered vertical metering tube through which fluid is adapted to pass upwardly and a metering float disposed for free up-and-down movement within the tube responsive to variations in the flow-rate of the fluid; the metering float having a transversely enlarged flow-constricting head portion adapted to define an annular orifice with the inner wall of the tube (the annular orifice being small when the float is near the bottom of the tube and being relatively large when the float is near the top of the tube) and having a specific gravity somewhat greater than the specific gravity of the fluid so that, when there is no upward flow of fluid through the tube, the float remains at the bottom of the tube. It is well known that, as the flow-rate increases, the float is moved upwardly within the tube, the height of the float (as read off against a suitably calibrated scale, either on the tube or adjacent thereto) being a measure of the rate-of-flow.

The present invention contemplates the provision of a metering tube which will guide the metering float axially along the tube and which will eliminate the need for any dynamically centered floats as well as the need for a separate guide-wire which has heretofore commonly been employed for so guiding the float when not dynamically centered.

Generally speaking, the present invention contemplates a metering tube which is tapered (or otherwise formed so as to have axially-varying cross-sectional area) and which is provided on its inner wall with a plurality (for Example 3) of circumferentially-spaced inwardly-extending axial beads or ribs; the beads providing a plurality of vertical line-contacts or lands which serve to center the metering float along the axis of the tube with a minimum of friction or resistance.

For the purpose of illustrating the invention, there is shown in the accompanying drawings one form thereof which is at present preferred, since the same has been found in practice to give satisfactory and reliable results, although it is to be understood that the various instrumentalities of which the invention consists can be variously arranged and organized and that the invention is not limited to the precise arrangements and organizations of the instrumentalities as herein shown and described.

Referring to the accompanying drawings in which like reference characters indicate like parts throughout:

Figure 1 represents a perspective view of a rotameter tube forming one embodiment of the present invention; parts being broken away better to reveal the construction thereof.

Figure 2 represents a bottom plan view of the tube of Figure 1.

Figure 3 represents a horizontal cross-sectional view generally along the line 3—3 of Figure 1.

Figure 4 represents a horizontal cross-sectional view generally along the line 4—4 of Figure 1.

Figure 5 represents a horizontal cross-sectional view generally along the line 5—5 of Figure 1.

Figure 6 represents a top plan view of the embodiment of Figure 1.

Figure 7 represents a more or less schematic side elevational view showing a stage in the formation of a mandrel used in producing the metering tube of Figure 1.

Figure 8 represents a vertical cross-sectional view generally along the line 8—8 of Figure 7.

In Figures 1 to 6, there is shown a metering tube indicated generally by the reference character 10, which is adapted for use with a metering float 11 to indicate the rate-of-flow of a fluid passing upward through said tube. The metering tube of the present invention may be used with other forms of metering float and the present invention is not limited to the float 11 which is the subject of my copending application, Serial No. 535,625, filed May 15, 1944.

The tube 10 is adapted for connection within any suitable frame having "heads" or "fittings" (not shown) or within separate "heads" or "fittings" (not shown); the ends of the tube being adapted to be connected in fluid-tight relationship to said "heads" or "fittings" in conventional manner by suitable stuffing-boxes or end-gaskets (not shown).

The tube 10 is downwardly tapered throughout most of its length; that is, from its upper end 12 to the point 13.

The tube 10 is preferably provided with a cylindrical inner bore 14 at its lower portion; that is, from the point 13 to the lower end 15.

Three inwardly-extending beads, ribs or fins 16 are formed on the tapered inner bore of said tube 10; the beads 16 being circumferentially spaced 120° apart.

The beads 16 are rounded in cross-section and are so formed that their inner faces or tips form vertically-extending float-guiding lines along the tapered portion of the tube 10. That is, the beads 16 are relatively pronounced at the upper end 12 of the tube 10 and gradually become less pronounced downward along the tapered portion of the tube until they disappear at the point 13.

As can be seen particularly in Figure 6, the inner surfaces of the bead 16 form continuations of the cylindrical lower bore 14 of the tube 10; the beads necessarily becoming more pronounced as they extend upward along the tube due to the taper of said tube; the tips of the beads being the same distance from the axis, throughout.

It can thus be seen that the beads provide three shoulders or lands which maintain the float 11 in proper position along the axis of the tube 10. Additionally, these ribs reinforce the tube and materially increase its structural strength.

The tube 10 is formed upon a mandrel 17 shown in Figures 7 and 8 in a manner to be hereinafter described.

The mandrel 17, which is of stainless steel or other suitable heat-resistant material, is downwardly tapered through most of its length, that is, from its upper end 18 to the point 19 thereof. The lower portion of the mandrel 17 is provided with a cylindrical outer surface 20; the cylindrical surface 20 extending from the point 19 to the lower end 21 of said mandrel.

Three gooves 22 are provided upon the tapered portion of the mandrel 17. The grooves 22 are circumferentially spaced 120° apart on the mandrel and extend axially therealong. The bottoms of the grooves 22 are generally parallel to and in continuation of the cylindrical surface 20. Thus, due to the taper of the mandrel, the grooves 22 are relatively deep at the end 18 of the said mandrel and gradually become more shallow until they disappear at the point 19.

As shown in Figures 7 and 8, the grooves 22 are preferably formed by a rotatable milling cutter 23. The mandrel is adjusted relative to the cutter 23 so that the teeth of the cutter extend just to the surface of the cylindrical portion 20 of said mandrel. The mandrel is then slowly moved relative to the rotating cutter (vertically downward in Figure 7). It is evident that, as the outwardly flaring outer surface of the mandrel moves past the cutter 23, the teeth of the cutter will cut progressively deeper into the mandrel and thus form a progressively deeper groove therein. That is, the teeth of the milling cutter 23 will always remain in the same position relative to the axis of the mandrel 17 so that the bottom of the groove will be parallel to the axis (and in continuation of the cylindrical surface 20).

After one groove has been formed, the mandrel is simply rotated 120° to form a second groove, after which the third groove is similarly formed.

In forming the beaded tube 10, a cylindrical glass tube having an inside diameter slightly greater than the maximum diameter of the grooved mandrel 17 is mounted upon the mandrel; the cylindrical tube and mandrel being mounted upon any conventional glass lathe wherein they are slowly axially rotated and the glass tube is externally heated. The glass tube is evacuated and is progressively raised to the softening point (from the smaller end to the larger end of the mandrel) and, due to the differential pressure thereon, is progressively collapsed upon the grooved mandrel.

That portion of the glass tube adjacent the cylindrical portion 20 of the mandrel 17 thereby is formed into the cylindrical bore 14. That portion of the glass tube adjacent the grooved tapered portion of the mandrel 17 is formed into a tapered inner bore; the beads 16 being formed when the softened glass is forced into the grooves 22 on the mandrel 17.

As the beads 16 are formed, slight indentations 24 are formed in the outer wall of the tube 10.

One form of glass lathe which may be employed for rotating, evacuating and heating the glass tube upon the grooved mandrel 17 is shown in copending application Serial No. 521,168 of George W. Pfleghar, filed February 5, 1944 which has matured into Patent No. 2,423,113.

As is conventional in the art of forming glass metering tubes, the original cylindrical tube is made somewhat greater in length than the final tapered beaded tube 10; the ends of the tube being cut off and polished after the beaded tube has been finally formed.

While the novel beaded construction of the present invention (providing line-contact centering for the metering float) is intended primarily for use with a tapered metering tube wherein the wall recedes radially along the axis of the tube (so that there is a marked tendency for an unguided dynamically-unstable float to "wobble"), these beads may also be used with other types of metering tubes or chambers.

The novel float-guide bead construction of the present invention is superior to conventional float-guiding wires or rods heretofore employed. That is, when rotameters having such float-guiding wires or rods are used for any length of time, there is a tendency for solid matter to settle out upon the guide-wire or guide-rod and also to settle in the guide-hole of the float. This sedimentation causes friction between the float and the guide-wire or guide-rod and thus results in "binding" of the float upon the wire. That is, due to this deposit of solid matter, the float is no longer entirely free to move vertically along the wire or rod. As a result, the float not only has a tendency to "stick" in the tube, but also is apt to give incorrect flow-rate readings (since, upon a slight increase or decrease in the flow-rate, the float has a tendency to remain in its original position due to this extra friction, instead of rising or settling quickly and smoothly to the new position corresponding to the changed flow-rate).

Furthermore, the provision of the circumferentially-spaced small beads upon the surface of the tube also tends to prevent binding or friction between the float and the tube wall. That is, when rotameters employing conventional unbeaded metering tubes, particularly tubes having cylindrical surfaces, are used for any length of time, there is a tendency for solid matter to settle out on the tube wall. This sedimentation, occurring as it does over a large circumferential extent, causes undue friction and binding between the flow-constricting periphery of the float and the tube wall, when the periphery of the float is close to the tube wall (as for instance, where the tube has cylindrical surfaces or where the float is adjacent the smaller end of a tapered tube).

In the novel beaded tube of the present invention, on the other hand, the periphery of the float is always appreciably spaced apart from the main wall or bore of the tube so that this friction or binding cannot occur. The small circumferential dimensions of the rounded tips of the beads do not permit sufficient sedimentation appreciably to affect the free movement of the float; the small amount of solid matter which might settle on the tips of the beads being removed when the periphery of the float passes therealong.

The present invention may be embodied in other specific forms without departing from the spirit or essential attributes thereof, and it is therefore desired that the present embodiments be considered in all respects as illustrative and not restrictive, reference being had to the appended claims rather than to the foregoing description to indicate the scope of the invention.

Having thus described the invention, what I claim as new and desire to protect by Letters Patent is:

1. A metering tube adapted for use in a rotameter and having a tapered inner bore and having a plurality of circumferentially-spaced inwardly-protruding axially-extending float-guiding beads formed on said bore, said beads having convex cross-section and having relatively small circumferential dimension, the tips of said beads lying in a cylindrical surface of revolution substantially co-axial with said tube, whereby they present relatively narrow guide-lines towards the float of said rotameter for centering the float.

2. A rotameter including an elongated vertical tapered metering chamber, a flow-constricting metering float disposed within said chamber and adapted for free up-and-down movement therewithin responsive to variations in rate of flow of the fluid passing therethrough, the position of said float within said chamber being an indication of the rate-of-flow, said metering chamber having a plurality of circumferentially-spaced transversely-protruding axially-extending float-guiding beads formed on the inner wall thereof, said beads having convex cross-section and having relatively small circumferential dimension, the tips of said beads extending substantially parallel to the axis of said chamber, the periphery of said float passing close to the tips of said beads, said beads presenting relatively narrow guide-lines towards said float for centering the float.

3. A rotameter including an elongated tapered metering chamber, a metering float having at least one relatively thin circumferential flow-constricting peripheral edge disposed within said chamber and adapted for free up-and-down movement therein responsive to variations in the rate of flow of the fluid passing through said chamber, the position of said float within said chamber being an indication of the rate-of-flow, said metering chamber having a plurality of circumferentially-spaced inwardly-protruding float-guide beads formed on the inner wall thereof and extending longitudinally of the chamber, said guide beads having a generally convex cross-section whose apex projects towards the float, and having a relatively small circumferential dimension, the innermost edge or tips of said guide-beads formed by the apexes of their convex cross-sections lying in a cylindrical surface of revolution co-axial with said metering chamber, the peripheral edge of said float passing close to the tips of said beads, and said beads forming with the peripheral edge of said float guide-means which are of such small areas that they tend to approach points.

KERMIT FISCHER.

REFERENCES CITED

The following references are of record in the file of this patent:

UNITED STATES PATENTS

| Number | Name | Date |
| --- | --- | --- |
| 332,344 | Wood | Oct. 15, 1872 |
| 1,301,714 | Kueppers | Apr. 22, 1919 |
| 1,580,678 | Roucka | Apr. 13, 1926 |
| 2,091,792 | Niesemann | Aug. 31, 1937 |
| 2,106,193 | Sloan | Jan. 25, 1938 |
| 2,209,739 | Meyer | July 30, 1940 |
| 2,215,041 | Hostetter | Sept. 17, 1940 |
| 2,333,884 | Porter | Nov. 9, 1943 |
| 2,354,255 | Gillum et al. | July 25, 1944 |
| 2,377,861 | Brewer | June 12, 1945 |
| 2,384,800 | Cox | Sept. 18, 1945 |
| 2,389,957 | Cox | Nov. 27, 1945 |
| 2,391,852 | Winton | Dec. 25, 1945 |